April 3, 1951 W. T. ROBERTS 2,547,540
POWER MOWER
Filed March 14, 1946 2 Sheets-Sheet 1
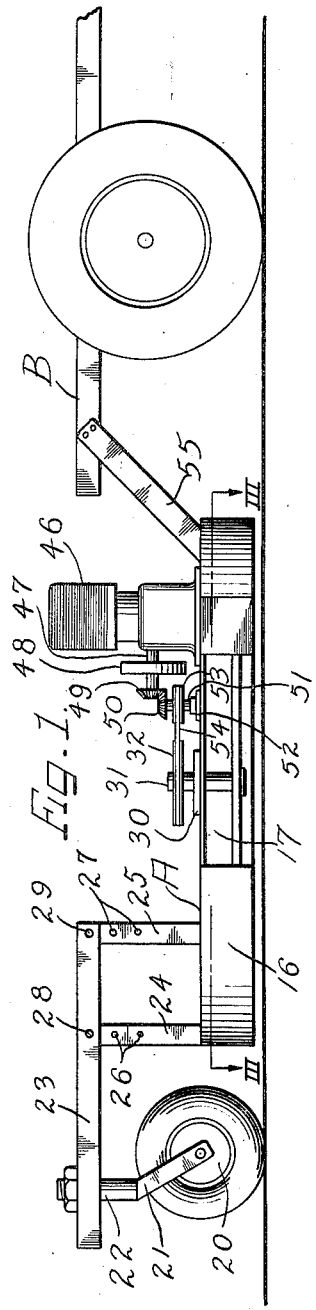
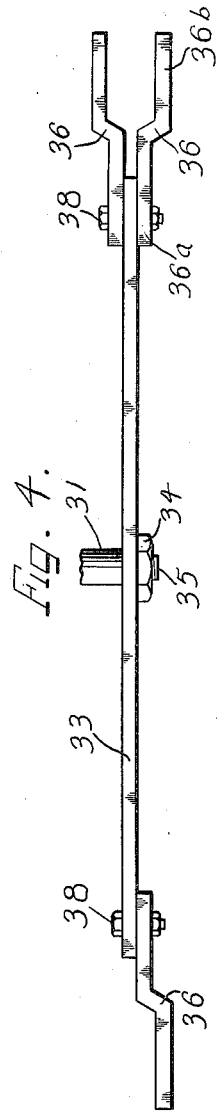
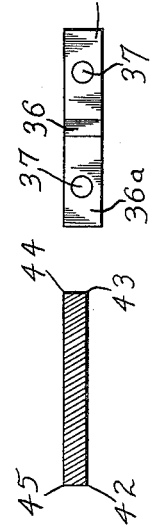
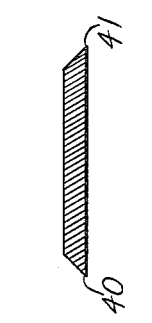
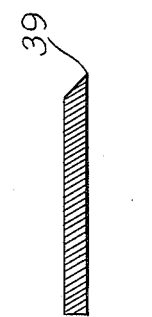
*Inventor*
WILEY T. ROBERTS.

April 3, 1951   W. T. ROBERTS   2,547,540
POWER MOWER

Filed March 14, 1946   2 Sheets-Sheet 2

Inventor
WILEY T. ROBERTS.

by The Firm of Charles K. Wills
Attys

Patented Apr. 3, 1951

2,547,540

UNITED STATES PATENT OFFICE 2,547,540

POWER MOWER

Wiley T. Roberts, Liberal, Kans.

Application March 14, 1946, Serial No. 654,435

1 Claim. (Cl. 56—25.4)

The present invention relates to power mowers and particularly to mowers having rotatable cutting means, rotatable in horizontal planes.

The present invention is directed, more specifically, to cutting blades or knives mounted on a rotatable cutter bar in pivoted relation and movable by centrifugal action into cutting position, the blades or knives swinging away from cutting position whenever the blades encounter obstructions.

An object of the present invention is to provide a power mower with cutting blades responsive to centrifugal force for moving them into cutting position and which may be moved away from cutting position whenever obstructions are encountered.

Another object of the present invention is to provide a power mower of the type utilizing a horizontally disposed rotatable cutter blade, and having a housing with a discharge opening or passageway therein for discharging cuttings and the like, laterally of the direction of movement of the mower.

A further object of the present invention is to provide a power mower of the rotatable cutter bar type, with blades which may be reversed end for end on the bar to prolong the cutting action per blade whenever a cutting margin thereof becomes dull.

A still further object of the present invention is to provide in a power mower of the horizontally rotatable cutter bar type, cutting blades mounted to move into or out of cutting position on axes at right angles to the plane of rotation of the bar.

The invention has for another object the provision of a power mower of the rotatable cutter bar type, constructed to produce maximum cutting action with a minimum number of parts.

The above, other and further objects of the present invention will be apparent from the following description and accompanying drawings.

The accompanying drawings illustrate an embodiment of a power mower embodying the principles of the present invention, and the views thereof are as follows:

Figure 1 is a side elevational view of the power mower of the present invention, showing it attached to the front end of a tractor;

Figure 3:
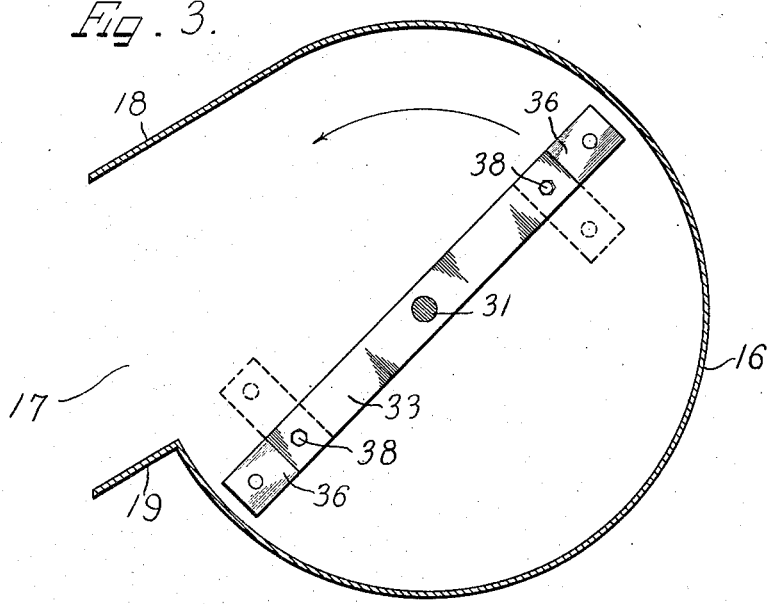

Figure 3 is a horizontal sectional view through the housing taken substantially on line III—III of Figure 1 just underneath its top or cover and showing in full lines the positions of the cutting blades or knives when extended by centrifugal force to cutting position, and in dotted lines, the swung-back position of the cutting blades whenever the blades encounter obstructions during the cutting operation;

Figure 4 is a side elevational view of the rotatable cutter bar showing, at the left-hand end thereof, a single cutting blade mounted for use, and at the right-hand end thereof two similar cutting blades mounted one above the other;

Figure 5 is an end view of a cutting blade illustrating the manner of sharpening the cutting edge when but a single blade is used;

Figure 6 is an end view of another cutter blade having two sharpened beveled edges;

Figure 7 is an end view of a cutting blade which is rectangular in elevation and which has four right-angular cutting edges; and, Figure 8 is a plan view of a blade of the form of Figure 7.

It is to be understood, at the outset, that the figures of the drawings are schematic only, and in nowise must limit the scope of the present invention except insofar as the gist of the present invention is concerned.

The power mower of the present invention may be hand propelled or motor propelled in which event it would be attached to a suitable machine, such as a conventional tractor, truck or the like. The mower has herein been illustrated as motor propelled.

Referring to Figure 1, A designates a housing, generally circular in plan, having a closed top 15 and a depending annular flange or skirt 16 the latter extending substantially 270° along the periphery of the top 15. In order to discharge cuttings and foreign matter stirred up by rotation of the cutter bar, a side passageway or opening in the flange 16 is provided the opening in the present instance being such as to discharge cuttings and the like from the interior of the housing substantially laterally with respect to the direction of movement of the mower.

Figure 2:
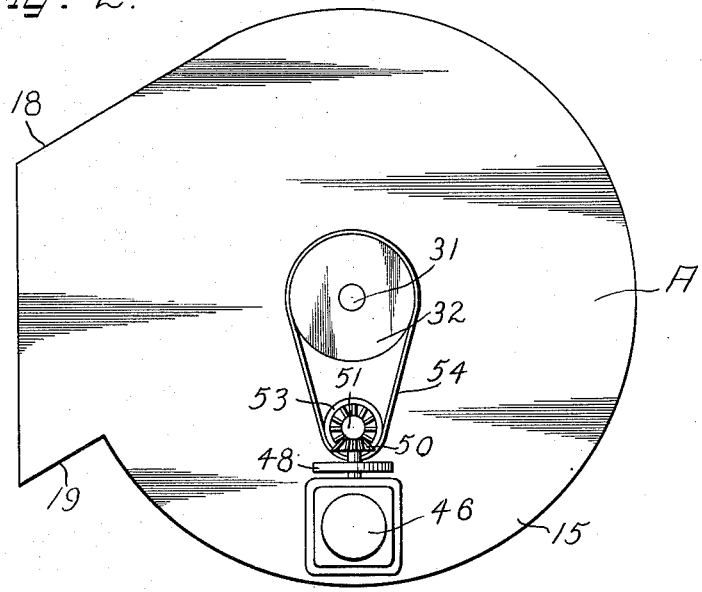
Figure 2 is a top plan view of the housing and showing the manner of driving a cutter bar which is rotatable within the housing.

The discharge passageway is indicated at 17 which opening is formed by straight portions 18 and 19 engaging the flange 16, as clearly illustrated in Figures 2 and 3, portion 18 being substantially tangential, and portion 19 being substantially radial.

The front or leading end of the housing, and of the mower, is supported on the single wheel 20 mounted on a yoke 21 which is mounted to swivel, at 22, in a forwardly extending member 23. Rising from the forward end of the housing A are spaced posts 24 and 25, each of which is provided with a plurality of holes 26 and 27 respectively to receive pins 28 and 29 for connecting the posts to the frame member 23 to thereby attach the front wheel 20 to the mower structure.

The provision of the holes 26 and 27 makes it possible to vertically adjust the leading end of the housing A, with respect to the ground, in the manner described.

Mounted on the top 15 of the housing is a bearing 30 which supports a vertically disposed shaft 31 the lower end of which extends within the housing and the upper end of which is provided with a pulley or power transmitting means 32.

A cutter bar 33 having a hole in the middle thereof whereby it may be attached to the lower end of the shaft 31 is formed as a flat bar having holes in its ends, with one hole per end. The length of the cutter bar 33 is less than the interior diameter of the flange 16.

The cutter bar 33 is shown as removably secured to the lower end of the shaft 31 by means of a nut 34 which engages a reduced threaded end 35 of the shaft, as is illustrated in Figure 4.

Referring to Figures 3 and 4, pivotally secured to the ends of the cutter bar 33 are cutting blades or knives 36, the knives being similar in design and construction.

Each of the blades 36 has two holes 37 in it, the holes being disposed near the ends of the blade so that it may be reversed end for end with respect to the cutter bar 33.

It is to be particularly noted in Figure 1 that the cutter bar and its connected blades are rotatable in a horizontal plane that is spaced above the lower edge of the skirt 16.

The blades 36 are pivotally attached to the cutter bar 33 by bolts 38 passing through the holes in the ends of the cutter bar and a hole 37 of a blade. The blades being thus pivotally mounted on the cutter bar, swing by centrifugal force into cutting position as the cutter bar is rotated, in service. Should the rotating cutter bar encounter obstacles, the blades will then swing back to the dotted line positions of Figure 3, thus escaping the obstacles and reducing such opposition to rotation of the cutter bar and blades occasioned by the encountered obstructions which reduction in rotation would occur if the blades were rigidly secured to the ends of the cutter bar.

Figure 4, at the left-hand end thereof, shows one cutting blade 36 pivoted at the left end of the bar. At the right-hand end of Figure 4 two blades 36 are pivoted to the right end of the bar, in superposed relationship thus constituting a lower blade and an upper blade, on the same end of the cutter bar.

In practice it is preferable to use two superposed blades at each end of the cutter bar and when the cutting edges of the blades then in use become dull, the bar may be removed from the shaft 31, reversed, attached to the shaft thus presenting in the lower blade position what were formerly the blades in the upper blade positions. In this manner sharp cutting edges may be utilized without having to stop operation and grind the blades.

Referring to Figures 4 and 3, it will be noted that a blade 36 is made with two offset portions 36a and 36b. After the cutting edges on the portion 36b of the blade become dull, the blades may be removed from the cutter bar 33 and the portion 36b thereto pivoted thus presenting the portion 36a in cutting position. The edges of the portions 36a and 36b are sharpened so that every blade carries more than one cutting edge.

Figures 5, 6 and 7 illustrate end views of cutting blades sharpened differently.

Figure 5 is an end view of a blade with one beveled cutting edge 39 which is a manner of sharpening when but a single blade is attached to an end of the cutter bar. That is to say, an edge of the portion 36b of the blade 36 of Figure 4 would be sharpened as illustrated in Figure 5 and an edge of the portion 36a of the same blade would be sharpened in the same manner so that after the edge of the portion 36b becomes dull the blade may be changed end for end and the sharp cutting edge on the portion 36a utilized. Thus the leading and trailing edges of every blade has a sharpened edge and an upright flat portion, the flat portion being effective to contact the cuttings and positively propel them through the discharge opening 17.

Where two blades per end are used, as shown at the right hand end of Figure 4, the edges of the blades may be sharpened as shown in Figure 6 or in Figure 7.

Figure 6 shows and end of a blade having two beveled cutting edges 40 and 41, while Figure 7 shows an end of a blade having four rectangular cutting edges 42, 43, 44, 45.

While it is preferable to apply the same number of blades to each end of the cutter bar 33, it is to be understood that but a single blade may be used, if so desired. In the event but one blade is used then the opposite end of the cutter bar would be counterbalanced in a suitable manner so that the rotative movement of the bar would be even.

Any suitable means may be provided for rotating the cutter bar 33. The means shown are in the form of an internal combustion engine 46 mounted on the housing A, and a gear drive. The engine shaft 47 carries a flywheel 48 and a bevel gear 49, which meshes with a bevel gear 50 carried by a vertically disposed shaft 51 mounted in a bearing 52 on the housing A. A pulley wheel 53 keyed to shaft 51 is connected by a belt 54 to the pulley wheel 32 on shaft 31. Thus, as the engine operates, the cutter bar 33 rotates. The bar and blades rotate at high speed thus developing air currents within the housing A which tend to raise any grass bent by the bange 16, to erect position to thereby facilitate cutting of the grass by the blades. The cuttings and any foreign matter, such as twigs, picked up by the air currents are discharged through the side outlet 17.

It is to be understood that the discharge outlet of the housing might be to the right, the intent being to discharge the cuttings and the like laterally, to prevent clogging of the wheels of the mower.

The mower may be connected to a tractor B in any suitable manner. Schematically, the shown attachment includes links or braces 55 between the housing A and tractor B.

The mower could be steered and pushed by a walking person. In such case, rear wheels would be attached to the mower, as would handles. The cutting operation would be the same.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a power mower having a horizontally disposed rotatable cutter bar, a housing open at the bottom and having a closed flat top and a generally cylindrical flange dependent therefrom, said flange having spaced parallel portions, one extending substantially radially and one extending substantially tangentially therefrom, respectively, to define a side discharge passageway, a vertical shaft rotatably supported from said housing axially thereof for mounting said cutter bar and means securing said cutter bar in position on said shaft above the plane of the lower edge of said flange.

WILEY T. ROBERTS.

REFERENCES CITED

The following references are of record in the file of this patent:

UNITED STATES PATENTS

| Number | Name | Date |
|---|---|---|
| 1,868,918 | Schenk | July 26, 1932 |
| 1,899,564 | Frey | Feb. 28, 1933 |
| 1,992,494 | Lundin | Feb. 26, 1935 |
| 2,171,750 | Hooe | Sept. 5, 1939 |
| 2,192,762 | Vincze | Mar. 5, 1940 |
| 2,281,639 | Swan | May 5, 1942 |
| 2,302,472 | Power | Nov. 17, 1942 |
| 2,403,236 | Phelps | July 2, 1946 |

FOREIGN PATENTS

| Number | Country | Date |
|---|---|---|
| 16,429/28 | Australia | Jan. 24, 1930 |
| 416,140 | Great Britain | Sept. 13, 1934 |